United States Patent [19]
Emery

[11] Patent Number: 5,769,479
[45] Date of Patent: Jun. 23, 1998

[54] BEDLINER WITH STIFFENING INWARD FLANGE

[75] Inventor: Phillip L. Emery, Portage, Wis.

[73] Assignee: Penda Corporation, Portage, Wis.

[21] Appl. No.: 743,017

[22] Filed: Nov. 1, 1996

[51] Int. Cl.$^6$ ........................................................ B60P 1/64
[52] U.S. Cl. .............................................................. 296/39.2
[58] Field of Search ................................ 296/39.2, 39.1; 224/539; 410/144; 220/410

[56] References Cited

U.S. PATENT DOCUMENTS

| | | | |
|---|---|---|---|
| 4,341,412 | 7/1982 | Wayne | 296/39.2 |
| 4,592,583 | 6/1986 | Dresen et al. | 296/39.2 |
| 4,944,612 | 7/1990 | Abstetar et al. | 296/39.2 |
| 5,100,193 | 3/1992 | Oprea et al. | 296/39.2 |
| 5,207,472 | 5/1993 | Gower | 296/39.2 |
| 5,221,119 | 6/1993 | Emery | 296/39.2 |

Primary Examiner—Joseph D. Pape
Attorney, Agent, or Firm—Lathrop & Clark

[57] ABSTRACT

A thermoplastic sheet is thermoformed to produce a bedliner with molded side walls which extend under the side rails of a pick-up truck. Each liner side wall has dished portions or recesses on each side of the truck box wheel well. The recesses extend beneath the truck box rail and provide access to truck box side wall structure such as board holders. Each recess is defined by a skirt which extends outwardly from the inner portions of the side wall to a generally vertical outward side wall panel which defines the outward portion of the recess. The skirt extends horizontally, for example in the plane of the board holder pocket, and extends upwardly on each side of the recess. An undercut stiffening flange is formed to extend inwardly from the outward side wall panel, and runs between the upwardly extending portions of the skirt. The undercut flange, together with the skirt and the outward side wall panel defines a rigidifying shell which contributes to the overall stiffness of the bedliner side wall. In addition, the undercut flange obscures and protects a greater portion of the truck bed sidewall sheet metal, thereby contributing to a more attractive bed lining.

8 Claims, 3 Drawing Sheets

BEDLINER WITH STIFFENING INWARD FLANGE

FIELD OF THE INVENTION

The present invention relates to thermoformed thermoplastic truck bedliners in general, and to under-the-rail bedliners in particular.

BACKGROUND OF THE INVENTION

Although long used in agricultural and commercial applications, pick-up trucks with open cargo beds have also become increasingly popular as personal and family vehicles. The commercial vehicle owner, although concerned with performance and cost-effectiveness of the vehicle, often considers the vehicle as a traveling company advertisement or symbol. A neat and well-maintained vehicle is more likely to favorably impress customers. Owners of personal vehicles, while concerned with functionality and efficiency, are also concerned with pride of ownership, personal image, and outward appearances. In addition, the automotive enthusiast desires to maintain his vehicle in as close to a "like new" condition as possible.

Truck bedliners of plastic or rubber are commonly employed to protect the pick-up truck cargo bed. These truck bedliners are available in a wide variety of configurations to suit the wide variety of available trucks. One-piece thermoformed thermoplastic truck bedliners provide a cost effective means of protecting the truck cargo bed.

To facilitate the handling of cargo, many truck cargo boxes have features which stabilize and control shifting of cargo in the truck box. For instance, the box may have stake holes along the upper peripheral edges so that boards may be inserted into the sides of the truck box, so extending the sides to retain light-weight, high-volume loads. Some truck boxes have supports on the side walls for horizontal boards, so that wide loads may be supported above the interiorly extending truck wheel wells on horizontal boards.

Bedliners come in two general types, so-called "over-the-rail" liners which extend up and cover the upper edges of the cargo box, and so-called "under-the-rail" liners in which side walls of the liner terminate under the upper flanges or rails of the cargo box. The outwardly extending flange of an over-the-rail liner contributes to the stiffness of the molded single sheet side wall. Conventional under-the-rail liners, on the other hand would need to sacrifice bed volume if provided with an outwardly extending flange which would extend under the rail. Nonetheless, with increasing manufacturing speeds and hence accelerated forming and cooling times for parts, there is a greater tendency for the thin bedliner sidewalls, usually on the order of one-quarter-inch thick, to become wavy and not conform cleanly to the truck bed side walls.

What is needed is an under-the-rail bedliner which has stiffened sidewalls to retain the sidewall shape with minimal warpage.

SUMMARY OF THE INVENTION

The thermoformed thermoplastic bedliner of this invention has molded side walls which extend under the side rails of a pick-up truck. Each liner side wall has dished portions or recesses on each side of the truck wheel well. The recesses extend beneath the truck box rail and typically provide access to truck box side wall structure such as board holders. Each recess is defined by a skirt which extends outwardly from the inner portions of the side wall to a generally vertical outward side wall panel which defines the outward portion of the recess. The skirt extends horizontally, for example in the plane of the board holder pocket, and extends upwardly on each side of the recess. An undercut stiffening flange is formed to extend inwardly from the outward side wall panel, and runs between the upwardly extending portions of the skirt. The undercut flange, together with the skirt and the outward side wall panel defines a rigidifying shell which contributes to the overall stiffness of the bedliner side wall. In addition, the undercut flange which terminates the side wall along the bedliner's upper margin, obscures and protects a greater portion of the truck bed sidewall sheet metal, thereby contributing to a more attractive bed lining.

It is an object of the present invention to provide a pick-up truck bedliner which has side walls with minimal warpage and undulation.

It is a further object of the present invention to provide a pick-up truck bedliner which preserves useful interior bed volume.

It is an additional object of the present invention to provide an under-the-rail pick-up truck bedliner which effectively shields the bed interior.

Further objects, features and advantages of the invention will be apparent from the following detailed description when taken in conjunction with the accompanying drawings.

DESCRIPTION OF THE PREFERRED EMBODIMENT

Figure 1:
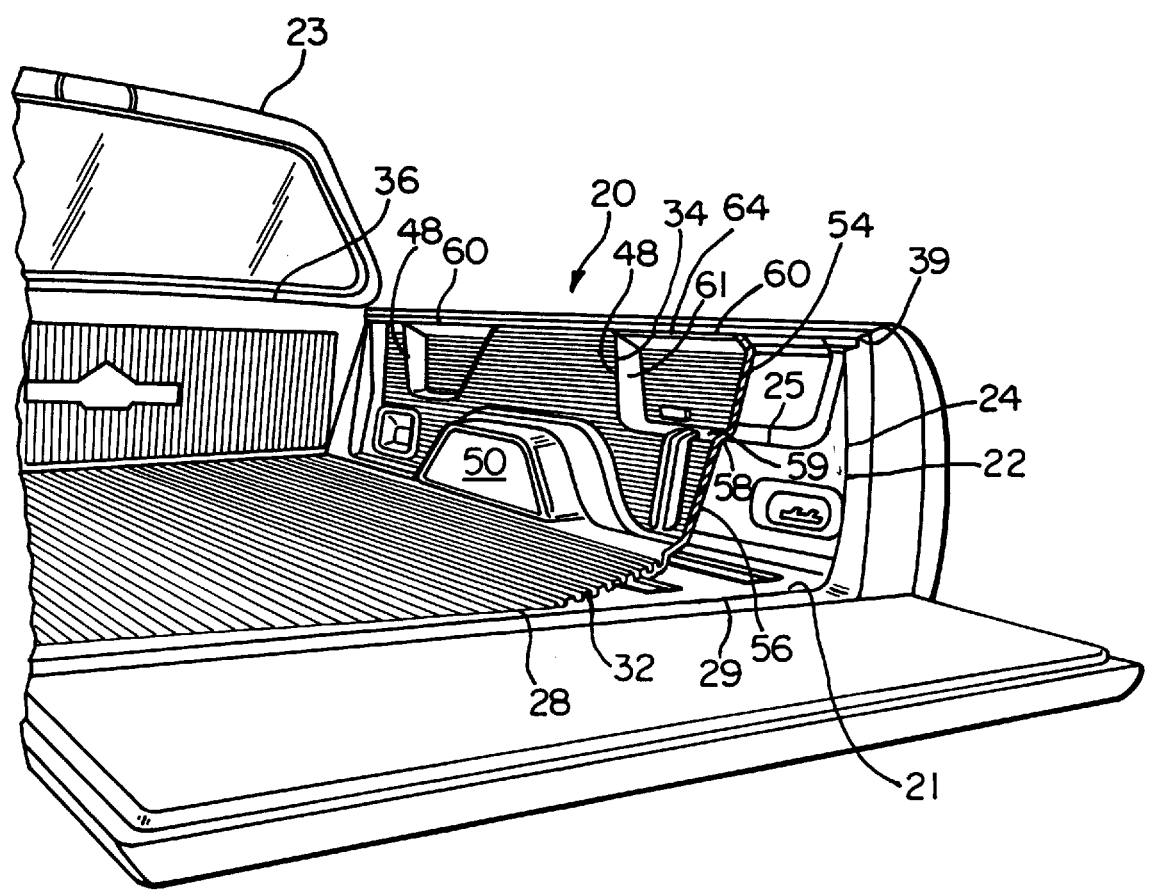
FIG. 1 is a fragmentary perspective view, partially broken away in section of the bedliner of this invention installed within a pick-up truck.

Referring more particularly to FIGS. 1–4, wherein like numbers refer to similar parts, a bedliner 20 of this invention is shown positioned within the bed 21 defined within the truck box 22 of a pick-up truck 23. The truck box 22 has generally vertical sheet metal side walls 24. Each truck box side wall 24 has formed therein a wheel well and ledges 25 on either side of the wheel well into which board holder and load restraining structures are formed.

The bedliner 20 is formed through a single sheet thermoforming process and is formed from thermoplastic sheet stock such as one-quarter inch thick high density polyethylene. In the thermoforming process air is drawn through a plurality of vacuum ports in a one-sided thermoforming vacuum mold to draw a heated thermoplastic sheet against the mold to form the sheet in general conformity to the shape of the mold. The molded sheet is then removed from the mold and trimmed or routed to reach its final shape.

The bedliner 20 has a bottom wall 28 which overlies and covers the truck cargo bed floor 29. The bedliner bottom wall 28 extends generally in a horizontal plane. However, it is preferably provided with a series of inverted U-shaped longitudinal ribs 32 which contribute to the rigidity of the bottom wall.

Two side walls 34 extend upwardly from the bedliner bottom wall 28 and are inclined from the liner bottom wall 28 at an angle greater than perpendicular, preferably an angle approximately eight-and-a-half degrees outwardly from vertical. The side walls 34 are joined at the front of the bedliner by a liner front wall 36, shown in FIG. 1, which extends upwardly from the bedliner bottom wall 28. The bedliner side walls 34 are positioned against the interior of the truck cargo bed side walls 24 and serve to shield and protect the truck side walls from soiling and damage.

Figure 4:
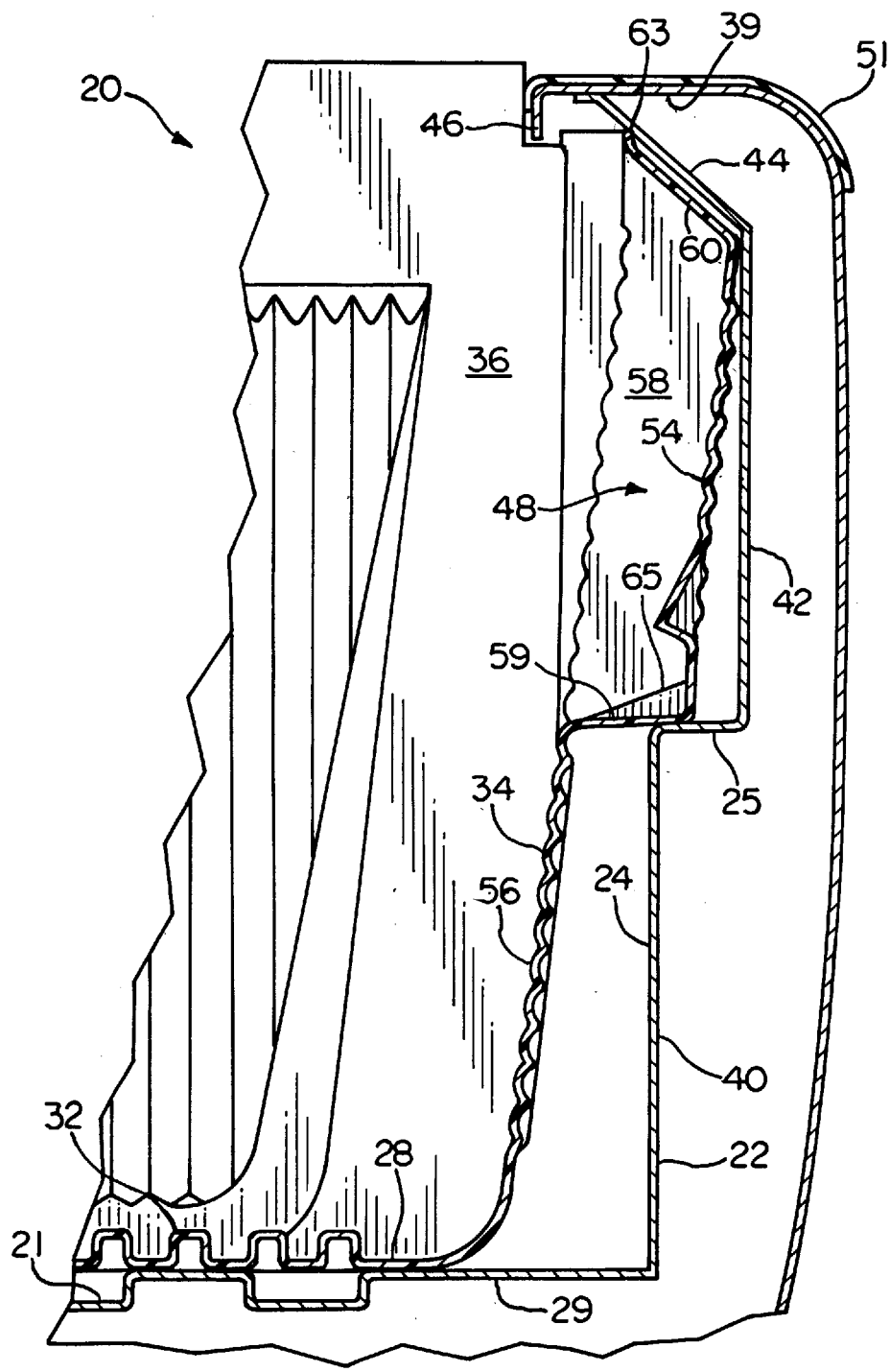
FIG. 4 is a cross-sectional view of the bedliner of FIG. 3 taken along section line 4—4.

As shown in FIG. 4, some modern trucks, for example the 1997 Ford F-series short bed and long bed pick-ups, have a truck box 22 with a side wall having an inner segment 40 which extends upwardly from the truck bed floor 29 and which jogs outwardly at a ledge 25, where one or more board holding surfaces are formed, and then extends upwardly in an outer segment 42. From the outer segment 42 a more steeply angled return segment 44 extends inwardly until it engages and is welded to the side rail 39. The side rail 39 extends downwardly at an inner lip 46. A plastic rail cap 51 is usually supplied by the manufacturer as original equipment.

Figure 3:
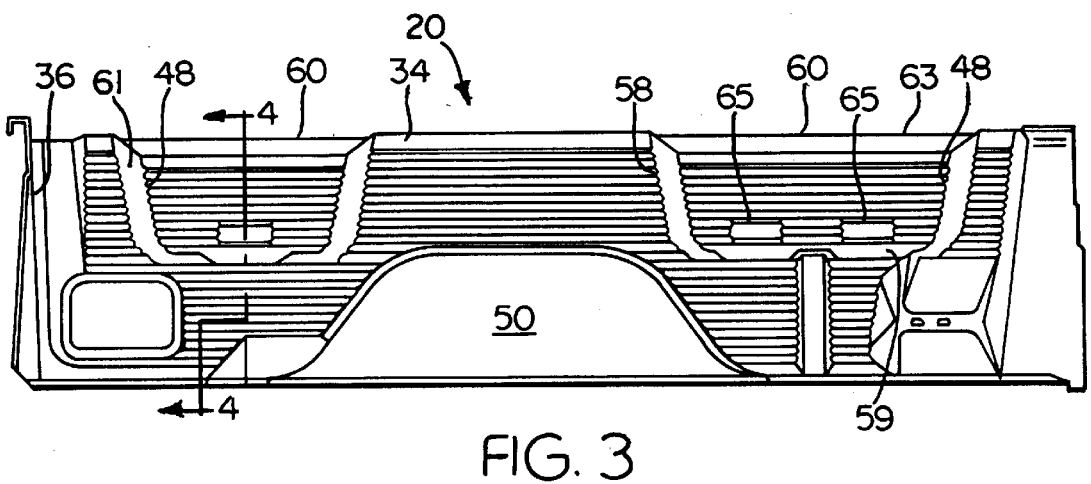
FIG. 3 is a cross-sectional view of the bedliner of FIG. 2 taken along section line 3—3.

As shown in FIG. 3, the bedliner 20 has conventional structure which lines the truck bed 21. Part of this structure comprises dished recesses 48 on each side of the bedliner wheel well covering 50. Each recess is defined outwardly by a generally upwardly extending outward side panel 54 which is spaced toward the truck box side wall 24 from lower inner portions 56 by a skirt 58. The skirt 58 extends approximately normal to the outward side panel 54 and has a horizontal segment 59 which runs horizontally above the truck side wall ledge 25. One or more board holder pockets 65 may be formed in the horizontal segment 59. The skirt 58 then extends upwardly at a front segment 61 and a back segment 62 to define the front and back of the recess 48. This structure of the recess 48 is known to the art. However, the result of a recess having an upper margin which is the trimmed edge of a generally planar sheet of plastic is a sidewall which is prone to warping or twisting in the course of manufacture. This tendency must be overcome by careful attention to manufacturing conditions, in general requiring an extended time in the thermoforming process.

The bedliner 20 of the present invention provides an antidote to forming warpage by molding into the upper margin of each dished recess 48 an undercut, inwardly extending stiffening flange 60. The flange 60, as shown in FIGS. 1 and 3 extends between the front segment 61 and the back segment 62 of the recess skirt 58. The flange 60 thus forms together with the outward side panel 54 and the skirt 58 a rigidifying shell 64 which contributes to the overall stiffness of the bedliner side wall 34 in which the recess 48 is formed. With the skirt and the flange all being somewhat flared from the outward side panel 54, the shell is approximately in the shape of a frustum of a pyramid. The bedliner side wall 34, instead of terminating in a planar thin wall, as in the prior art, terminates below the rail 39 in the inwardly extending stiffening flange 60. The flange 60 is preferably three-quarters of an inch or greater in width. In the illustrated embodiment, the flange 60 is approximately one-and-three-quarters of an inch in width. The flange 60, in addition to stiffening the side wall, contributes to covering and protecting the inclined return segment 44 of the truck side wall 24, in trucks having such an element. The stiffening flange 60 is a substantially planar segment which is inclined at an angle of approximately 45 degrees from the plane of the outward side panel. However, angles of less than 45 degrees or greater than 45 degrees may also be effectively employed. The undercut stiffening flange 60 terminates the bedliner side wall along the bedliner's upper margin 63.

Figure 2:
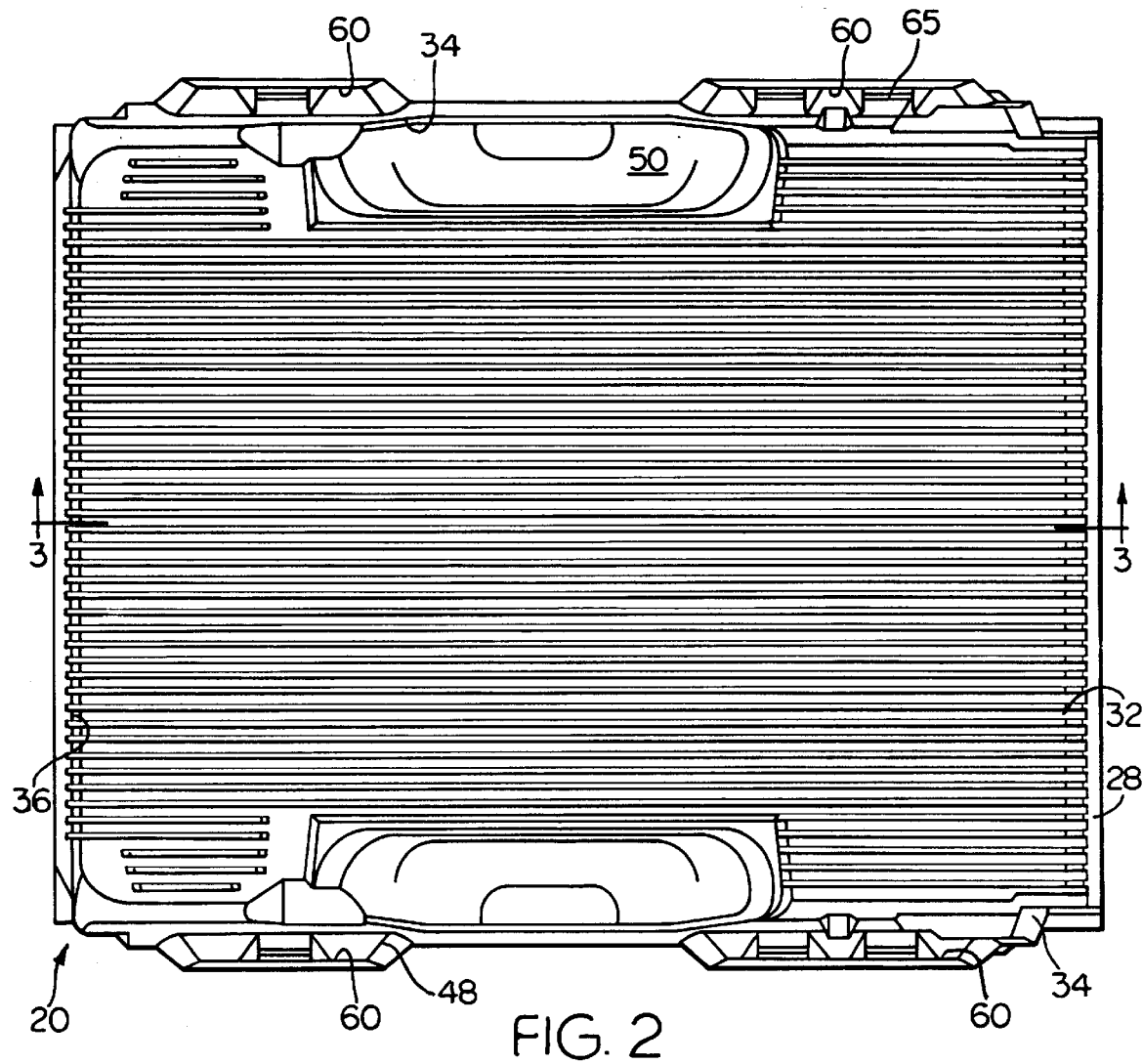
FIG. 2 is a top plan view of the bedliner of FIG. 1.

As shown in FIG. 2, a plurality of recesses 48 are formed in each bedliner side wall 34, with a separate stiffening flange 60 running along the upper margins of the recesses to form stiffening shells 64. The stiffening flanges 60, it will be noted, because they extend back in toward the bed from the side walls 34 which have a draft angle such that they are outwardly inclined, is formed as an undercut in the thermoforming process. The excess plastic above the flanges 60 is trimmed and removed after the part has been formed in the vacuum mold, and may result in a slight upward curve in the upper margin of the flange 60, as shown in FIG. 4.

Although the bedliners of this invention have been illustrated as incorporating a horizontal side wall rib pattern which is a registered trademark of Penda Corporation, the stiffening flange of this invention may also be used on side walls with some other pattern, or with no pattern.

It should be noted that bedliners of the present invention may be formed to be utilized with a wide variety of conventional truck beds, in which case the molded liner may take on a general shape which conforms to the dimensions of the particular bed. A bedliner may be formed, for example to in which the recess is positioned to extend above the level of the wheel well covering, and stretching between a front segment of the skirt and a rear segment of the skirt such that the back panel spans the wheel well covering, with the stiffening flange extending over the wheel well.

It is understood that the invention is not limited to the particular construction and arrangement of parts herein illustrated and described, but embraces such modified forms thereof as come within the scope of the following claims.

I claim:

1. A thermoformed thermoplastic under-the-rail truck bedliner for mounting within a vehicle cargo bed having opposed upwardly extending side walls, the liner comprising:

a bottom wall;

two side walls positioned outwardly of the bottom wall and which extend upwardly from opposite sides of the bottom wall; and portions of each bedliner side wall which define inner portions of the side wall which extend from the bottom wall;

portions of each bedliner side wall which define an outward side panel which is spaced outwardly from the inner portions toward the truck side wall;

a skirt which extends between and connects the inner portions of the side wall to the outward side panel, the skirt having a horizontally extending segment and upwardly extending front and rear segments; and a stiffening flange which extends inwardly, away from the truck side wall, the flange extending upwardly from the outward side panel and being connected to the front and rear segments of the skirt, the flange, the skirt and the outward side panel thereby forming a shell which stiffens the bedliner side wall and restricts warpage thereof, and the stiffening flange defining a terminating upper margin of the bedliner.

2. The bedliner of claim 1 wherein the stiffening flange is a substantially planar segment which is inclined at an angle of approximately 45 degrees from the plane of the outward side panel.

3. The bedliner of claim 1 wherein the width of the stiffening flange between the outward side panel and the terminating upper margin of the bedliner is greater than three quarters of an inch.

4. A thermoformed thermoplastic truck bedliner for mounting within a vehicle cargo bed having an upwardly extending side wall, the liner being of the type having a bottom wall, and two side walls which extend upwardly from opposite sides of the bottom wall, and portions of each bedliner side wall which define a recess positioned to extend above the level of a wheel well covering, the recess having a generally outwardly extending skirt having a horizontal segment positioned adjacent a ledge of the truck cargo bed and front and rear skirt segments, the skirt extending from an outward side panel of the liner, the improvement comprising:

a stiffening flange which extends inwardly from the outward side panel, and extends between the front skirt segment and the rear skirt segment, to thereby rigidify the sidewall of the bedliner.

5. The bedliner of claim 4 wherein the stiffening flange is a substantially planar segment which is inclined at an angle of approximately 45 degrees from the plane of the outward side panel.

6. The bedliner of claim 4 wherein the width of the stiffening flange between the outward side panel and a terminating upper margin of the bedliner is greater than three quarters of an inch.

7. A thermoplastic thermoformed pick-up truck bedliner with molded side walls which extend under the side rails of a pick-up truck, the bedliner comprising:

a bottom wall;

two side walls which extend upwardly from opposite sides of the bottom wall;

portions of each side wall which define a dished recess on each side of a truck box wheel well; wherein the recesses extend beneath a truck box rail and provide access to a truck box side wall, and wherein each recess is defined by a skirt which extends outwardly from inner portions of the side wall to a generally vertical outward side wall panel which defines the outward portion of the recess, and wherein the skirt has segments which extend horizontally, and segments which extend upwardly on each side of the recess; and an undercut stiffening flange formed to extend inwardly from the outward side wall panel, wherein the stiffening flange extends between the upwardly extending portions of the skirt, and wherein the undercut flange, together with the skirt and the outward side wall panel define a rigidifying shell which contributes to the overall stiffness of the bedliner side wall.

8. A unitary thermoplastic thermoformed pick-up truck bedliner (20) with molded side walls (34) which extend under the side rails (39) of a pick-up truck (23), the bedliner (20) comprising:

a three sided box having a bottom wall (28), two side walls (34) which extend upwardly from opposite sides of the bottom wall (28), and a front wall (36) extending upwardly from the bottom wall (28) and joining the two side walls (34);

portions of each side wall (34) which define a dished recess (48) on each side of a truck box wheel well cover (50), wherein the recess extends beneath a truck box rail (39) and defines four segments, an upper flange (60), a first vertical segment (61), a second vertical segment (62), and a lowermost segment (59) which extend inwardly from a side panel (54);

portions of the lowermost segment (59) which define a means for receiving a load restraining board (65), wherein the upper flange (60), the first segment (61) and the second segment (62) taper outwardly from the side panel (54) forming a somewhat frustopyramidal skirt (58) which stiffens an un-joined edge (63) terminating the upward extension of the upper flange (60).

\* \* \* \* \*

UNITED STATES PATENT AND TRADEMARK OFFICE
CERTIFICATE OF CORRECTION

PATENT NO. : 5,769,479
DATED : June 23, 1998
INVENTOR(S) : Phillip L. Emery

It is certified that error appears in the above-identified patent and that said Letters Patent is hereby corrected as shown below:

In column 4, line 64, change "margin" to -- edge --.

In column 5, line 21, change "margin" to -- edge --.

Signed and Sealed this

Eighth Day of September, 1998

Attest:

BRUCE LEHMAN

*Attesting Officer*      *Commissioner of Patents and Trademarks*